United States Patent

Wong

[11] Patent Number: 5,822,445
[45] Date of Patent: Oct. 13, 1998

[54] APPARATUS FOR IDENTIFYING FINGERPRINTS

[75] Inventor: John Douglas Evan Wong, Ottawa, Canada

[73] Assignee: Dew Engineering and Development Limited, Ottawa, Canada

[21] Appl. No.: 889,437

[22] Filed: Jul. 8, 1997

Related U.S. Application Data

[63] Continuation of Ser. No. 495,321, Jun. 27, 1995, abandoned.

[51] Int. Cl.$^6$ ....................................................... G06K 9/00
[52] U.S. Cl. .............................. 382/127; 382/124; 356/71
[58] Field of Search ............................ 382/115, 124–125, 382/127; 356/71; 283/68, 69; 340/825.3–825.34

[56] References Cited

U.S. PATENT DOCUMENTS

| | | | |
|---|---|---|---|
| 3,482,498 | 12/1969 | Becker | 382/127 |
| 3,527,535 | 9/1970 | Monroe | 356/71 |
| 5,210,588 | 5/1993 | Lee | 356/71 |
| 5,467,403 | 11/1995 | Fishbine et al. | 382/116 |

FOREIGN PATENT DOCUMENTS

| | | | |
|---|---|---|---|
| 362210590 | 9/1987 | Japan | 382/127 |
| 3194677 | 8/1991 | Japan | 382/127 |

Primary Examiner—Leo H. Boudreau
Assistant Examiner—Bhavesh Mehta
Attorney, Agent, or Firm—Neil Teitelbaum & Associates

[57] ABSTRACT

A fingerprint identifying device includes a transparent prism having a fingerprint receiving face, a fingerprint viewing face at an acute angle to the fingerprint receiving face, two opposed parallel faces perpendicular to the fingerprint receiving face and a further light-absorbing face generally opposite to the fingerprint viewing face. A light source in the form of a bank of LEDs is provided for transmitting light into the prism. A light diffuser is provided for light transmitted from the light source such that in operation diffused light is transmitted into the prism through both of the parallel faces and against the fingerprint receiving face to provide substantially uniform illumination of a finger contacting the fingerprint receiving face, a fingerprint image being visible through the fingerprint viewing face. Preferably, the bank of LEDs is disposed at the two opposed parallel faces adjacent to the fingerprint receiving face. It is also preferred if the light source extends above the plane of the fingerprint receiving face to illuminate the edges of a finger from outside of the prism.

15 Claims, 3 Drawing Sheets

APPARATUS FOR IDENTIFYING FINGERPRINTS

This application is a Continuation of application Ser. No. 08/495,321, filed on Jun. 27, 1995, now abandoned.

FIELD OF THE INVENTION

This invention relates to fingerprint identification, and in particular to an optical apparatus therefor.

DESCRIPTION OF THE PRIOR ART

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404.

In one case, U.S. Pat. No. 3,527,535, the illumination surface is perpendicular to the first surface. Accordingly, the light entering the prism is directed parallel to the first surface. However, the level of illumination achieved in this manner is insufficient and does not uniformly illuminate the finger.

In most of these devices a high angle prism is employed. This results in a relatively small viewing surface area and more light is required to effectively illuminate the print receiving surface. More distortion of the fingerprint image is also created because imperfections in the prism are magnified by the smaller viewing surface.

SUMMARY OF THE INVENTION

It is an object of the invention to provide a fingerprint identification apparatus of the type described in aforementioned U.S. Pat. No. 3,527,535, but provides for enhanced and substantially uniform illumination of a finger whose fingerprint is to be identified.

According to the invention, an apparatus for identifying fingerprints is provided, comprising transparent prism means having a fingerprint receiving face, a fingerprint viewing face at an acute angle to the fingerprint receiving face, two opposed parallel faces perpendicular to the fingerprint receiving face and a further light-absorbing face generally opposite to the fingerprint viewing face, light source means for transmitting light into the prism, and light diffuser means for diffusing light transmitted from the light source, such that in operation diffused light is transmitted into the prism through both of the parallel faces and against the fingerprint receiving face to provide substantially uniform illumination of a finger contacting the fingerprint receiving face, a fingerprint image being visible through the fingerprint viewing face.

BRIEF DESCRIPTION OF THE DRAWINGS

Exemplary embodiments of the invention will now be described in conjunction with the drawings, in which.

DETAILED DESCRIPTION

Figure 1:
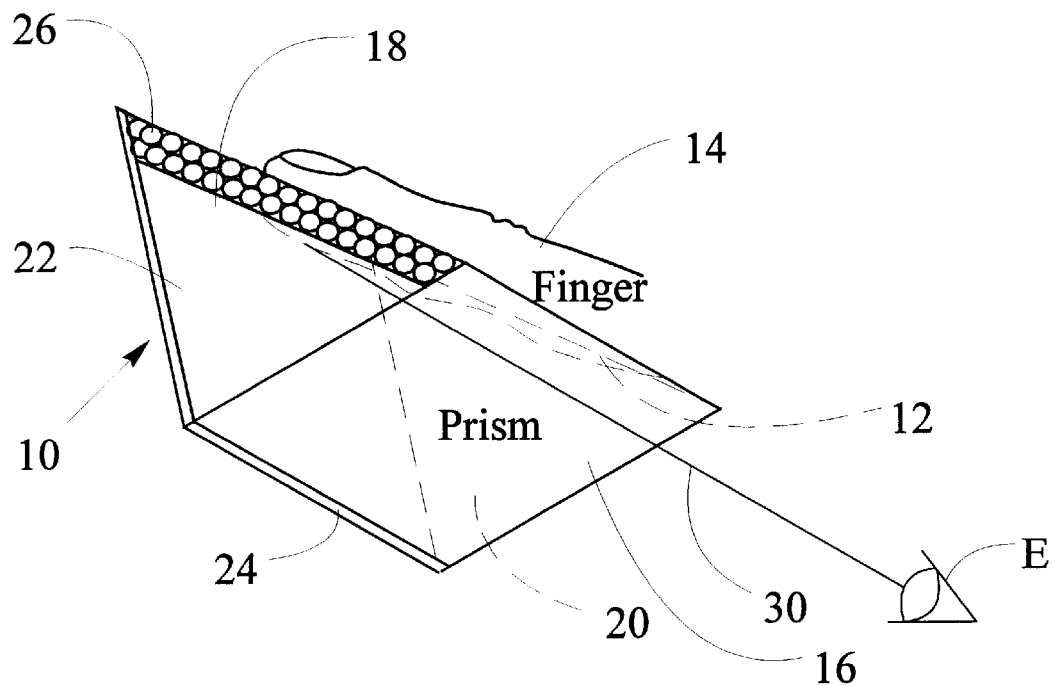
FIG. 1 is a perspective view of an embodiment of an apparatus for identifying fingerprints according to the invention.

The embodiment of the invention illustrated in FIG. 1 comprises a transparent triangular prism 10 which can be made of glass or another suitable material. Other prism shapes such as polygonal e.g. tetragonal may also be employed. The index of refraction of the prism material is preferably in the range of about 1–2.

The prism 10 has a fingerprint receiving face 12, upon which a finger 14 is placed. A fingerprint viewing face 16 is disposed at an acute angle, typically of about 45°–50°, to the fingerprint receiving face 12. This permits a larger viewing surface and a sharper viewed image than prior art devices. Two opposed parallel faces 18 and 20 are perpendicular to the fingerprint receiving face 12. A further light-absorbing face 22 is located generally opposite to the fingerprint viewing face 16. Light absorption is provided by either a light absorbing coating or overlay 24.

In the embodiment of FIG. 1, the light source 26 is in the form of a multi-light emitting diode(LED) array, although other conventional light sources could be used. A suitable LED array is one of the type described in U.S. Pat. No. 5,210,588 as comprising a number of high intensity ultraluminescence chips, which provides a light intensity of about three times that of common LEDs. The disclosure of this Patent is incorporated herein by reference. In this embodiment, the light source 26 is located adjacent to one of the parallel faces 18, near the fingerprint receiving face 12 and covers only a portion of the face 12. Substantially all of the light is transmitted into the prism. It has been found that when the light source is proximate to the prism, the print receiving face is heated to thereby improve the contact of the finger therewith resulting in a sharper image. A similar light source(see FIG. 4) is located adjacent to the other parallel face 20, to transmit light into the prism therethrough. If the prism is illuminated only through one face, the image will suffer from non-uniform lighting.

Although white light may be used, it is preferable to employ a monochromatic light source. Red light of a wavelength in the range of 700–800 nm is most preferred, since this wavelength range is at the highest response region of the conventional electronic imaging devices used. Illumination in the range of 0.5 to 2.5 lux has been found to be most effective.

Figure 4:
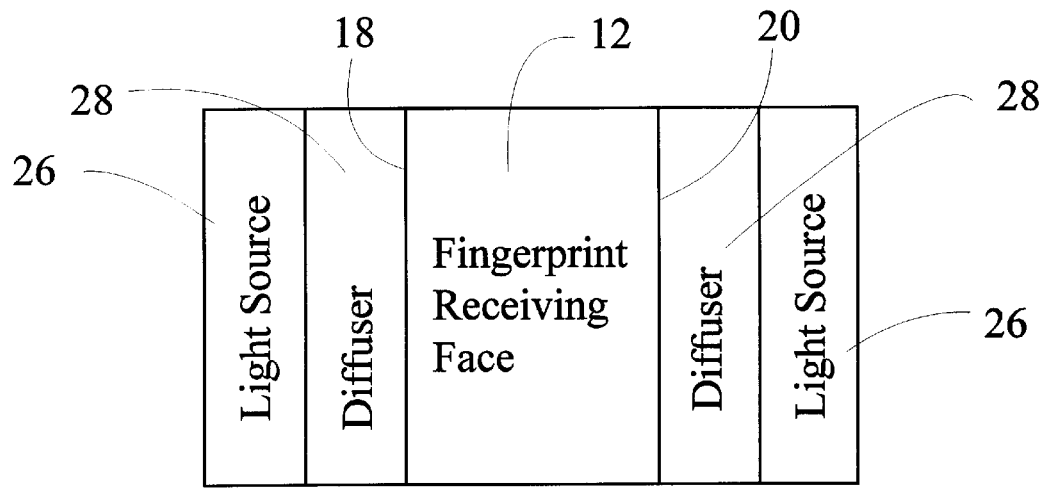
FIG. 4 is an end view in section of the embodiment of FIG. 2, including a self-supporting diffuser; and, FIG. 5 is a side elevation of still another embodiment of an apparatus according to the invention.
Figure 5:
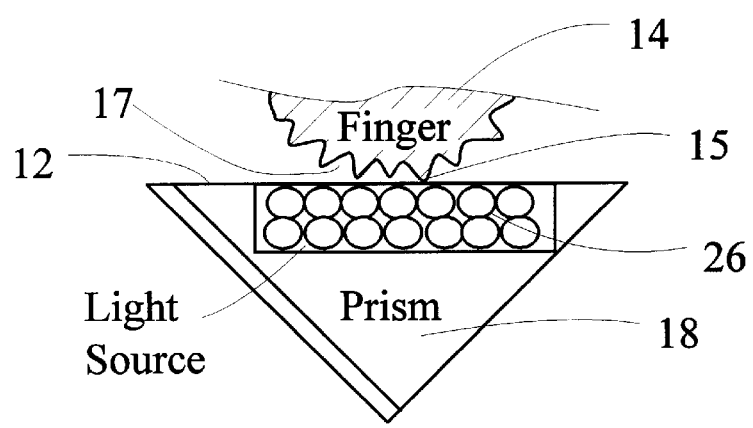

As best seen in FIG. 4, a diffuser means 28, in the form of a self-supporting plate, is provided for diffusing or scattering the light transmitted from the light source, so that diffused light is transmitted into the prism through both of the opposed parallel faces 18 and 20, and against the fingerprint receiving face 12, to provide substantially uniform illumination of a finger 14 placed thereon. An image of the fingerprint is visible through the viewing face 16. The diffuser may also be in the form of a coating or etching which could be on the prism face 18 and/or 20, or on the light source 26.

Figure 2:
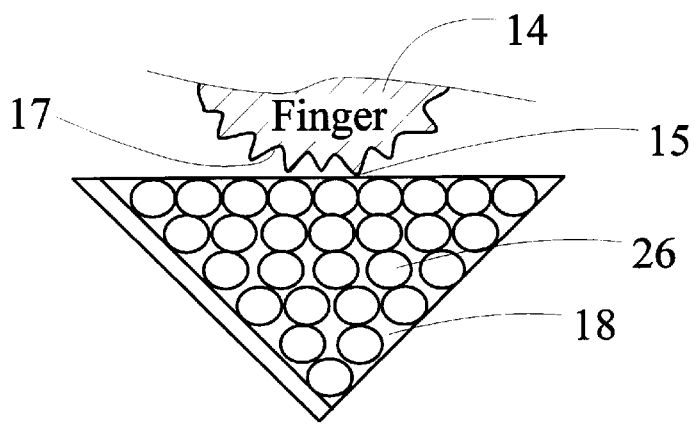
FIG. 2 is a side elevation of another embodiment of an apparatus according to the invention.

In the embodiment of FIG. 2, the multi-LED array 26 is located adjacent the parallel face 18, and covers substantially the entire face 18.

Figure 3A:
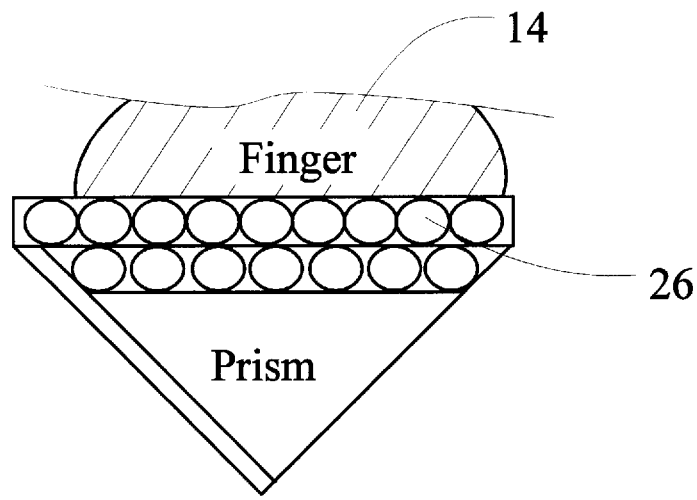
FIG. 3a is a side elevation of yet another embodiment of an apparatus according to the invention.
Figure 3B:
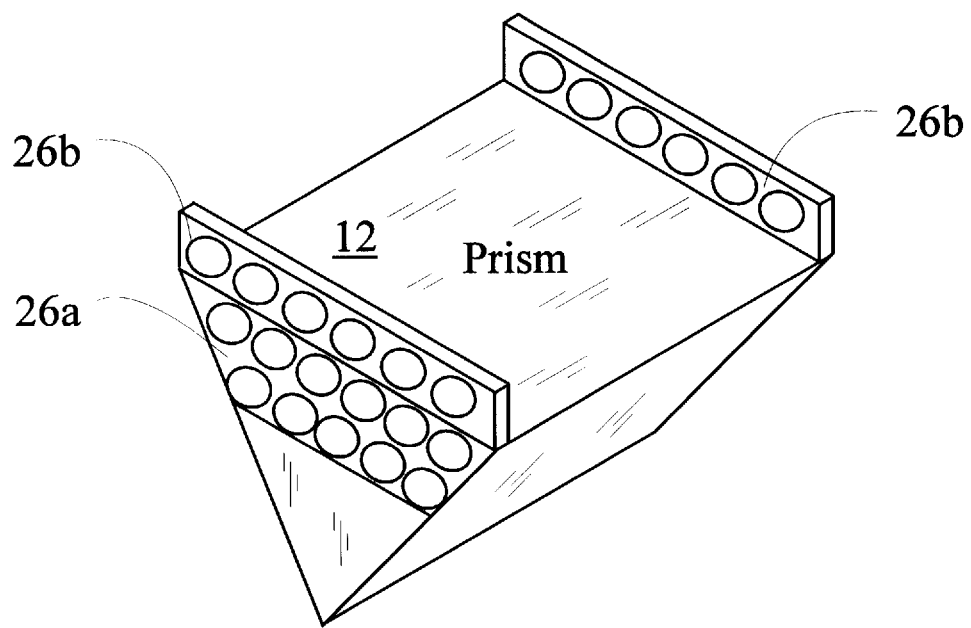
FIG. 3b is a perspective view of the embodiment shown in FIG. 3a of an apparatus according to the invention.

In the embodiment shown in FIG. 3b, the multi-LED array 26a and 26b extends above 26b and below 26a the plane of the fingerprint receiving surface 12, such that some of the light is directed directly against the side of a finger 14 contacting the fingerprint receiving surface 12, the remainder being transmitted into the prism through face 18. A corresponding light source arrangement is provided at the other parallel face 20. The diffuser extends above and beyond the plane of the print receiving surface as well. This arrangement has been shown to be advantageous. It has been found that a balanced lighting effect over the entire print area is achieved by illuminating the side of the finger in this manner. Accordingly, light directed against the side of the finger beyond the plane of the print receiving face illuminates the finger edges at the interface with the print receiving face to enhance the image in this area.

In summary, this embodiment provides a means for transmitting light both through the prism to illuminate the finger resting on the print receiving surface as well as providing a means of lighting the finger directly without those light rays propagating through the prism before reaching the finger resting on the print receiving surface. Thus, as is shown in FIG. 3b, light is directed into the prism, and as well is directed into the free space region beyond the plane of the fingerprint receiving face.

As mentioned above, FIG. 4 illustrates the diffuser means in the form of a self-supporting plate located between the light source 26 and the prism face 18. Also shown is a light source 26 at both faces 18 and 20.

In operation, diffused light is directed into the prism 10 through both of the opposed parallel faces 18 and 20, and against the fingerprint receiving face 12 to substantially uniformly illuminate a finger placed thereon. Where the ridges of the finger 15 touch the face 12 to form an interface, the illuminating light is diffusely reflected, and will exit the prism through the viewing face 16 along optical path 30 to the eye E of an operator.

Accordingly, the points where the ridges 15 are in contact with the face 12 will appear as illuminated and the non-contacting valleys 17 between the ridges will appear dark.

It will be appreciated that conventional imaging hardware (not shown) could be located in the optical path 30. For example, imaging lens, means for converting images to electrical signals e.g. a Videocon™ CCD or a CMOS device could be provided.

Of course, numerous other embodiments may be envisaged without departing from the spirit and scope of the claimed invention.

We claim:

1. An apparatus for identifying fingerprints, comprising:
   transparent prism means having a fingerprint receiving face, a fingerprint viewing face at an acute angle to the fingerprint receiving face, two opposed parallel faces perpendicular to the fingerprint receiving face and a further light-absorbing face generally opposite to the fingerprint viewing face,
   light source means for transmitting light into the prism, and
   light diffuser means for diffusing light transmitted from the light source,
   such that in operation diffused light is transmitted into the prism through both of the parallel faces and against the fingerprint receiving face to provide substantially uniform illumination of a finger contacting the fingerprint receiving face, a fingerprint image being visible through the fingerprint viewing face, the light source being located adjacent both of the parallel faces and extending beyond a plane of the fingerprint receiving face, whereby some of the light is directed directly against a finger contacting the fingerprint receiving face, the remainder of the light being transmitted into the prism through the parallel faces.

2. An apparatus according to claim 1, wherein the light source is a high intensity multi-light emitting diode array.

3. An apparatus according to claim 2, wherein the array is disposed near the fingerprint receiving surface and covers a portion of both of the parallel faces.

4. An apparatus according to claim 2, wherein the light source is a monochromatic.

5. An apparatus according to claim 4, wherein the monochromatic light is red light of a wavelength of 700–800 nm.

6. An apparatus according to claim 1, wherein the light source provides an illumination level in the range of 0.5–2.5 lux.

7. An apparatus according to claim 6, wherein the light source means is a high intensity multi-light emitting diode array located adjacent each of the parallel faces and covers substantially the entire face.

8. An apparatus according to claim 1, wherein the light source is a high intensity multi-light emitting diode array is located adjacent both of the parallel faces and wherein some of light emitting diodes extend beyond the plane of the fingerprint receiving face, whereby some of the light is directed against a finger contacting the fingerprint receiving face, the remainder of the light being transmitted into the prism through the parallel faces.

9. An apparatus according to claim 1, wherein the diffuser means is selected from the group consisting of a self-supporting plate, a coating on the parallel face of the prism or on the light source and an etching on the parallel face of the prism or on the light source.

10. An apparatus according to claim 1, wherein the acute angle is about 45°–50°.

11. An apparatus according to claim 10, wherein the prism is a triangular prism.

12. An apparatus according to claim 1, wherein the further face is coated with a light absorbing coating.

13. An apparatus according to claim 1, wherein the further face includes a light-absorbing overlay.

14. An apparatus for identifying fingerprints, comprising:
   transparent prism means having a fingerprint receiving face a fingerprint viewing face, at an acute angle to the fingerprint receiving face, two opposed parallel faces perpendicular to the fingerprint receiving face and a further light-absorbing face generally opposite to the fingerprint viewing face,
   light source means for transmitting light into the prism, such that in operation light is transmitted into the prism through both of the parallel faces and against the fingerprint receiving face to provide substantially uniform illumination of a finger contacting the fingerprint receiving face, a fingerprint image being visible through the fingerprint viewing face, the light source being located adjacent both of the parallel faces and extending beyond a plane of the fingerprint receiving face, whereby some of the light is directed directly against a finger contacting the fingerprint receiving face, the remainder of the light being transmitted into the prism through the parallel faces.

15. A method of illuminating a finger to identify a fingerprint placed on a imagining prism having a fingerprint receiving surface and parallel side faces, the method comprising the step of:

provflag a lighting source adjacent at least one of the side faces of the prism, said lighting source also extending beyond the prism and beyond the plane of the fingerprint receiving face of the prism and launching light from said lighting source into at least one of the side faces of the prism, and, providing light from the lighting source that extends above said plane of the fingerprint receiving face, so as to simultaneously illuminate a finger contacting the fingerprint receiving face from light launched through the prism and from light launched from outside the prism from the lighting source beyond the plane of the fingerprint receiving face, whereby in operation, some of the light is directed directly against a finger contacting the fingerprint receiving face, the remainder of the light being simultaneously transmitted into the prism through the parallel faces.

* * * * *